US012760170B2

(12) United States Patent
Kawakami

(10) Patent No.: US 12,760,170 B2
(45) Date of Patent: Oct. 13, 2026

(54) RUBBER COMPOSITION AND PNEUMATIC TIRE

(71) Applicant: BRIDGESTONE CORPORATION, Tokyo (JP)

(72) Inventor: Nao Kawakami, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 694 days.

(21) Appl. No.: 18/031,650

(22) PCT Filed: Dec. 8, 2021

(86) PCT No.: PCT/JP2021/045158

§ 371 (c)(1),
(2) Date: Apr. 13, 2023

(87) PCT Pub. No.: WO2022/124340

PCT Pub. Date: Jun. 16, 2022

(65) Prior Publication Data

US 2023/0383101 A1 Nov. 30, 2023

(30) Foreign Application Priority Data

Dec. 10, 2020 (JP) ................................ 2020-205180

(51) Int. Cl.

| | |
|---|---|
| ***C08L 9/06*** | (2006.01) |
| ***B60C 1/00*** | (2006.01) |
| ***C08K 3/36*** | (2006.01) |
| ***C08K 9/04*** | (2006.01) |
| ***C08L 7/00*** | (2006.01) |

(52) U.S. Cl.

CPC .................. *C08L 9/06* (2013.01); *B60C 1/00* (2013.01); *C08K 3/36* (2013.01); *C08K 9/04* (2013.01); *C08L 7/00* (2013.01); *C08K 2201/006* (2013.01); *C08L 2201/50* (2013.01); *C08L 2201/52* (2013.01)

(58) Field of Classification Search

CPC .. C08K 3/36; C08K 2201/006; C08J 2407/00; C08L 9/06; C08L 7/00

See application file for complete search history.

(56) References Cited

U.S. PATENT DOCUMENTS

| | | | | |
|---|---|---|---|---|
| 2008/0105346 | A1 | 5/2008 | Toyoda | |
| 2015/0011676 | A1* | 1/2015 | Miyazaki | C08L 91/00 523/156 |
| 2017/0044349 | A1 | 2/2017 | Iizuka | |
| 2018/0312002 | A1 | 11/2018 | Sakurai | |
| 2019/0211191 | A1* | 7/2019 | Ogasawara | C08L 45/00 |
| 2019/0309146 | A1 | 10/2019 | Yokoyama et al. | |

FOREIGN PATENT DOCUMENTS

| | | | |
|---|---|---|---|
| CN | 106459516 | A | 2/2017 |
| JP | 2016-84457 | A | 5/2016 |
| JP | 2017-186462 | A | 10/2017 |
| JP | 2019-182982 | A | 10/2019 |
| JP | 2020-94113 | A | 6/2020 |
| JP | 2020-100677 | A | 7/2020 |
| WO | 2006/062119 | A1 | 6/2006 |
| WO | 2017/077714 | A1 | 5/2017 |

OTHER PUBLICATIONS

Partial machine translation of JP 2020100677 A (Year: 2020).*
International Search Report dated Feb. 22, 2022 in Application No. PCT/JP2021/045158.
Chinese search report dated Jul. 21, 2026, in Application No. 202180081606.0.

* cited by examiner

*Primary Examiner* — Kregg T Brooks
(74) *Attorney, Agent, or Firm* — Sughrue Mion, PLLC

(57) ABSTRACT

Provided are a pneumatic tire in which balance between dry steering stability and low rolling resistance is improved while excellent on-ice performance and wet grip performance are maintained, and a rubber composition from which the tire is obtained. The rubber composition contains a rubber component containing a natural rubber and a modified styrene-butadiene copolymer rubber having a glass transition temperature of −50° C. or lower, a resin, a filler containing silica having a cetyltrimethylammonium bromide specific surface area of 190 $m^2/g$ or more, and an oil component. A content of the modified styrene-butadiene copolymer rubber in the rubber component is more than 50% by mass.

9 Claims, No Drawings

RUBBER COMPOSITION AND PNEUMATIC TIRE

CROSS REFERENCE TO RELATED APPLICATIONS

This application is a National Stage of International Application No. PCT/JP2021/045158, filed Dec. 8, 2021, claiming priority to Japanese Patent Application No. 2020-205180, filed Dec. 10, 2020.

TECHNICAL FIELD

The present invention relates to a rubber composition and a pneumatic tire.

BACKGROUND ART

For the purpose of improving wet grip performance of a tire, disclosed is a rubber composition containing a rubber component (A), a thermoplastic resin (B), and a filler (C), in which the rubber component (A) contains 10 to 100 parts by mass of a modified styrene-butadiene copolymer rubber having a glass transition temperature (Tg) of −50° C. or lower per 100 parts by mass of the rubber component (A), and the rubber composition contains 5 to 30 parts by mass of the thermoplastic resin (B) per 100 parts by mass of the rubber component (A) (see PTL 1).

CITATION LIST

Patent Literature

PTL 1: WO2017/077714

SUMMARY OF INVENTION

Technical Problem

However, the rubber composition according to PTL 1 is insufficient in balance between on-ice performance and abrasion resistance.

In the related art, in order to improve the balance between the wet grip performance and the on-ice performance, large-particle silica is mixed in a large number of parts, but low rolling resistance and dry steering stability contradict each other. In recent years, tires for a sport utility vehicle (SUV) are also under severe environmental regulations, and are also required to have more excellent low rolling resistance, abrasion resistance, and dry steering stability.

An object of the present invention is to provide a pneumatic tire in which balance between dry steering stability and low rolling resistance is improved while excellent on-ice performance and wet grip performance are maintained, and a rubber composition from which the tire is obtained, and to achieve the object.

Solution to Problem

<1> A rubber composition containing: a rubber component containing a natural rubber and a modified styrene-butadiene copolymer rubber having a glass transition temperature of −50° C. or lower; a resin; a filler containing silica having a cetyltrimethylammonium bromide specific surface area of 190 $m^2/g$ or more; and an oil component, in which a content of the modified styrene-butadiene copolymer rubber in the rubber component is more than 50% by mass.

<2> The rubber composition according to <1>, in which the silica is contained in an amount of 60 parts by mass or more per 100 parts by mass of the rubber component.

<3> The rubber composition according to <1> or <2>, in which the filler contains aluminum hydroxide.

<4> The rubber composition according to <3>, in which the aluminum hydroxide is contained in an amount of 1 to 20 parts by mass per 100 parts by mass of the rubber component.

<5> The rubber composition according to <3> or <4>, in which a ratio (s/a) of a content (s) of the silica to a content (a) of the aluminum hydroxide is 5 to 10 on a mass basis.

<6> The rubber composition according to any one of <1> to <5>, in which the rubber component further contains 1% to 30% by mass of a modified styrene-butadiene copolymer rubber having a glass transition temperature of −40° C. or higher.

<7> The rubber composition according to any one of <1> to <6>, in which the oil component is contained in an amount of more than 0 parts by mass and 20 parts by mass or less per 100 parts by mass of the rubber component.

<8> The rubber composition according to any one of <1> to <7>, in which the resin has a glass transition temperature of higher than 60° C.

<9> A pneumatic tire using: the rubber composition according to any one of <1> to <8>.

Advantageous Effects of Invention

According to the present invention, it is possible to provide a pneumatic tire in which balance between dry steering stability and low rolling resistance is improved while excellent on-ice performance and wet grip performance are maintained, and a rubber composition from which the tire is obtained.

DESCRIPTION OF EMBODIMENTS

<Rubber Composition>

A rubber composition according to the present invention contains: a rubber component containing a natural rubber and a modified styrene-butadiene copolymer rubber having a glass transition temperature of −50° C. or lower; a resin; a filler containing silica having a cetyltrimethylammonium bromide specific surface area of 190 $m^2/g$ or more; and an oil component. A content of the modified styrene-butadiene copolymer rubber in the rubber component is more than 50% by mass.

The rubber composition according to the present invention may further contain aluminum hydroxide, a modified styrene-butadiene copolymer rubber having a glass transition temperature of −40° C. or higher, and the like.

Hereinafter, the modified styrene-butadiene copolymer rubber having a glass transition temperature of −50° C. or lower may be referred to as a "low-Tg modified SBR", the cetyltrimethylammonium bromide specific surface area may be referred to as a "CTAB specific surface area", and the modified styrene-butadiene copolymer rubber having a glass transition temperature of −40° C. or higher may be referred to as a "high-Tg modified SBR".

In addition, steering stability on a dry road surface may be referred to as "DRY steering stability", brake performance on a wet road surface may be referred to as "WET performance", and brake performance on an icy and snowy road surface may be referred to as "SNOW performance".

The modified styrene-butadiene copolymer rubber is excellent in dispersibility of silica in the rubber composition, and thus, when the low-Tg modified SBR is contained in a large number of parts, i.e., more than 50% by mass, in the rubber component, the silica can also be contained in a large number of parts. In the present invention, it is considered that, when fine-particle-size silica having a CTAB specific surface area of 190 $m^2/g$ or more is used as the silica, balance between dry steering stability and low rolling resistance can be improved while excellent on-ice performance is maintained. In addition, it is considered that wet grip performance of a tire can be maintained when the rubber composition contains the resin and the oil component.

Hereinafter, the rubber composition and a pneumatic tire according to the present invention will be described in detail.

[Rubber Component]

A rubber component contains a natural rubber (NR) and a modified styrene-butadiene copolymer rubber having a glass transition temperature of −50° C. or lower (low-Tg modified SBR), and a content of the low-Tg modified SBR in the rubber component is more than 50% by mass.

When the rubber component does not contain the natural rubber and the low-Tg modified SBR in an amount of more than 50% by mass, the silica cannot be contained in a large number of parts, excellent on-ice performance cannot be exhibited, and balance between dry steering stability and low rolling resistance cannot be improved.

From a viewpoint of further improving the on-ice performance, the dry steering stability, and the low rolling resistance of a tire, the content of the low-Tg modified SBR in the rubber component is preferably more than 50% by mass, more preferably 55% by mass or more, and still more preferably 57% by mass or more, and is preferably 90% by mass or less, more preferably 80% by mass or less, and still more preferably 75% by mass or less.

The low-Tg modified SBR has a glass transition temperature (Tg) of −50° C. or lower.

When the Tg of the low-Tg modified SBR is higher than −50° C., SNOW performance cannot be maintained.

From a viewpoint of maintaining the SNOW performance, the Tg of the low-Tg modified SBR is preferably −60° C. or lower, and more preferably −60° C. to −70° C.

The Tg can be obtained by a differential scanning calorimeter.

The low-Tg modified SBR preferably has a bound styrene content of 5% to 25%.

When the bound styrene content in the low-Tg modified SBR is 5% or more, WET performance can be secured, and when the bound styrene content is 25% or less, the SNOW performance can be secured.

From a viewpoint of balance between the SNOW performance and the WET performance, the bound styrene content in the low-Tg modified SBR is more preferably 7% or more, and still more preferably 8% or more, and is more preferably 20% or less, and still more preferably 15% or less.

The bound styrene content can be obtained by dissolving a modified SBR in a solvent such as chloroform and using an amount of absorption by a phenyl group in styrene at an ultraviolet absorption wavelength (around 254 nm).

From the viewpoint of the SNOW performance, a content of the natural rubber in the rubber component is preferably 10% by mass or more, more preferably 20% by mass or more, and still more preferably 25% by mass or more, and is preferably 45% by mass or less, and more preferably 43% by mass or less.

From a viewpoint of further improving wet grip performance and the dry steering stability of the tire, it is preferable that the rubber component further contains a modified styrene-butadiene copolymer rubber having a glass transition temperature of −40° C. or higher (high-Tg modified SBR).

A content of the high-Tg modified SBR in the rubber component is preferably 1% by mass or more, more preferably 5% by mass or more, and still more preferably 7% by mass or more, and is preferably 30% by mass or less, more preferably 25% by mass or less, and still more preferably 20% by mass or less.

The high-Tg modified SBR has a glass transition temperature (Tg) of −40° C. or higher.

When the Tg of the high-Tg modified SBR is −40° C. or higher, the WET performance can be maintained.

From a viewpoint of balance between the WET performance and the low rolling resistance, the Tg of the high-Tg modified SBR is preferably −40° C. to −15° C., more preferably −40° C. to −20° C., and still more preferably −40° C. to −30° C.

The high-Tg modified SBR preferably has a bound styrene content of 30% to 55%.

When the bound styrene content in the high-Tg modified SBR is 30% or more, the WET performance can be secured, and when the bound styrene content is 55% or less, the SNOW performance can be maintained.

From the viewpoint of the balance between the SNOW performance and the WET performance, the bound styrene content in the high-Tg modified SBR is more preferably 35% or more, and more preferably 50% or less, and is more preferably 45% or less, and still more preferably 40% or less.

The low-Tg modified SBR and the high-Tg modified SBR are not particularly limited as long as the low-Tg modified SBR and the high-Tg modified SBR have a structure in which a part (for example, a molecular terminal) of a molecular chain of the styrene-butadiene copolymer rubber (SBR) is modified.

Among these, from a viewpoint of having a high affinity for a filler (particularly, silica), it is preferable to modify a terminal of the styrene-butadiene copolymer rubber by a silane compound. Examples of the silane compound include a silane compound having a glycidoxy group, an alkoxysilane compound, and a hydrocarbyloxysilane compound.

Only one of the natural rubber, the low-Tg modified SBR, and the high-Tg modified SBR may be used, or two or more thereof may be used.

When both the low-Tg modified SBR and the high-Tg modified SBR are contained, a mass ratio preferably satisfies a formula as follows.

$$1.3 \leq WL/WH \leq 19$$

In the above formula, WL represents a mass of the low-Tg modified SBR, and WH represents a mass of the high-Tg modified SBR.

WL/WH is more preferably 1.5 or more, still more preferably 1.8 or more, even more preferably 2.3 or more, still even more preferably 2.8 or more, and yet still more preferably 3.3 or more.

In addition, WL/WH is more preferably 12 or less, still more preferably 10 or less, even more preferably 9 or less, still even more preferably 8.5 or less, yet still more preferably 8 or less, yet even more preferably 7.5 or less, and yet still even more preferably 7 or less.

The rubber component may further contain another rubber component other than the natural rubber, the low-Tg modified SBR, and the high-Tg modified SBR.

Examples of another rubber component include a synthetic rubber such as a polyisoprene rubber (IR), a polybutadiene rubber (BR), an ethylene-propylene-diene rubber (EPDM), a chloroprene rubber (CR), a halogenated butyl rubber, and an acrylonitrile-butadiene rubber (NBR). These rubber components may be used alone, or two or more rubber components may be used in combination.

[Filler]

The rubber composition according to the present invention contains, as a filler, silica having a cetyltrimethylammonium bromide specific surface area of 190 $m^2/g$ or more.

When the CTAB specific surface area of the silica is less than 190 $m^2/g$, low rolling resistance and on-ice performance of a tire are not excellent. An upper limit of the CTAB specific surface area of the silica is not particularly limited and is preferably 250 $m^2/g$.

From a viewpoint of further improving the low rolling resistance and the on-ice performance of the tire, the CTAB specific surface area of the silica is preferably 195 $m^2/g$ or more.

The CTAB specific surface area of the silica can be measured by a method according to a method in ASTM-D3765-80.

The silica is not particularly limited as long as it has a CTAB specific surface area of 190 $m^2/g$ or more, and examples thereof include wet method silica (hydrous silicic acid), dry method silica (anhydrous silicic acid), and colloidal silica.

The silica having a CTAB specific surface area of 190 $m^2/g$ or more may be a commercially available product, and can be obtained as, for example, Zeosil Premium 200MP (trade name) manufactured by Rhodia and 9500GR (trade name) manufactured by Evonik.

The rubber composition preferably contains 60 parts by mass or more of the silica having a CTAB specific surface area of 190 $m^2/g$ or more per 100 parts by mass of the rubber component.

When a content of the silica having a CTAB specific surface area of 190 $m^2/g$ or more in the rubber composition is 60 parts by mass or more per 100 parts by mass of the rubber component, WET performance can be secured.

From a viewpoint of balance among the WET performance, DRY steering stability, and the low rolling resistance, the content of the silica having a CTAB specific surface area of 190 $m^2/g$ or more in the rubber composition is preferably 60 parts by mass or more, more preferably 65 parts by mass or more, and still more preferably 70 parts by mass or more per 100 parts by mass of the rubber component. In addition, the content of the silica in the rubber composition is preferably 90 parts by mass or less, and more preferably 85 parts by mass or less.

The silica having a CTAB specific surface area of 190 $m^2/g$ or more may be used alone or in combination of two or more thereof. Silica having a CTAB specific surface area of less than 190 $m^2/g$ may be used alone or in combination of two or more thereof.

The rubber composition according to the present application may contain both the silica having a CTAB specific surface area of 190 $m^2/g$ or more and the silica having a CTAB specific surface area of less than 190 $m^2/g$, and preferably contains only the silica having a CTAB specific surface area of 190 $m^2/g$ or more.

The content of the silica having a CTAB specific surface area of 190 $m^2/g$ or more is preferably 90% by mass or more and 100% by mass or less in a total amount of all silica.

Examples of the silica having a CTAB specific surface area of less than 190 $m^2/g$ include "ULTRASIL (registered trademark) VN 3".

The filler may further contain another filler such as aluminum hydroxide and carbon black.

(Aluminum Hydroxide)

From a viewpoint of achieving both low rolling resistance and wet grip performance of a tire at a high level, the filler preferably contains aluminum hydroxide.

Unlike reinforcing fillers such as silica and carbon black, aluminum hydroxide is a non-reinforcing filler, and thus viscoelasticity of the rubber composition is less likely to change even when the rubber composition contains aluminum hydroxide. In addition, even after the rubber composition is vulcanized to produce the tire, since aluminum hydroxide falls off from a rubber surface to impart roughness on a surface of the tire, the grip performance on a road surface is improved. As a result, both the low rolling resistance and the wet grip performance can be achieved at a high level.

Since aluminum hydroxide is a non-reinforcing filler, when the rubber composition contains aluminum hydroxide, abrasion resistance of a vulcanized rubber may be reduced. However, in the present invention, the low-Tg modified SBR is contained in a large number of parts, i.e., more than 50% by mass, in the rubber component, and thus the fine-particle-size silica having a CTAB specific surface area of 190 $m^2/g$ or more can be dispersed and contained in the rubber composition in a large number of parts. Therefore, it is possible to prevent a reduction in abrasion resistance.

The rubber composition preferably contains aluminum hydroxide in an amount of 1 to 20 parts by mass per 100 parts by mass of the rubber component.

When a content of aluminum hydroxide in the rubber composition is 1 part by mass or more per 100 parts by mass of the rubber component, both the low rolling resistance and the wet grip performance of the tire can be achieved at a higher level, and when the content is 20 parts by mass or less, a reduction in abrasion resistance of the vulcanized rubber can be further prevented.

The content of aluminum hydroxide in the rubber composition is preferably 3 parts by mass or more, more preferably 4 parts by mass or more, and still more preferably 5 parts by mass or more per 100 parts by mass of the rubber component. In addition, the content of aluminum hydroxide in the rubber composition is preferably 17 parts by mass or less, more preferably 16 parts by mass or less, and still more preferably 15 parts by mass or less.

A ratio (s/a) of a content (s) of the silica having a CTAB specific surface area of 190 $m^2/g$ or more to the content (a) of aluminum hydroxide is preferably 5 to 10 on a mass basis.

When the ratio (s/a) is 5 or more on a mass basis, WET performance can be secured, and when the ratio (s/a) is 10 or less, breaking strength can be maintained.

From a viewpoint of achieving both the low rolling resistance and the wet grip performance of the tire at a higher level, the ratio (s/a) is preferably 6 or more, and more preferably 7 or more, and is preferably 10 or less, and more preferably 9 or less, on a mass basis.

(Carbon Black)

The carbon black is not particularly limited and can be appropriately selected according to the purpose. The carbon black is, for example, preferably of FEF, SRF, HAF, ISAF, SAF, or ISAF-HS grade, and more preferably of HAF, ISAF, SAF or ISAF-HS grade.

From a viewpoint of improving an elastic modulus of a vulcanized rubber, a content of the carbon black in the rubber composition is preferably 1 part by mass or more, and more preferably 2 parts by mass or more per 100 parts by mass of the rubber component. In addition, the content of the carbon black in the rubber composition is preferably 20 parts by mass or less, more preferably 15 parts by mass or less, and still more preferably 10 parts by mass or less.

[Silane Coupling Agent]

The rubber composition according to the present invention contains the low-Tg modified SBR as the rubber component, and the rubber composition according to the present invention may further contain a silane coupling agent in order to reinforce a bond between the silica and the rubber component, to further improve a reinforcing property of the rubber composition, and to improve dispersibility of the silica.

A content of the silane coupling agent in the rubber composition according to the present invention is preferably 5% to 15% by mass or less with respect to the content of the silica. When the content of the silane coupling agent is 15% by mass or less with respect to the content of the silica, an effect of improving the reinforcing property and the dispersibility of the rubber component is obtained, and economic efficiency is less likely to be impaired. In addition, when the content of the silane coupling agent is 5% by mass or more with respect to the content of the silica, the dispersibility of the silica in the rubber composition can be improved.

The silane coupling agent is not particularly limited, and preferable examples thereof include bis(3-triethoxysilylpropyl) disulfide, bis(3-triethoxysilylpropyl) trisulfide, bis(3-triethoxysilylpropyl) tetrasulfide, bis(3-trimethoxysilylpropyl) disulfide, bis(3-trimethoxysilylpropyl) trisulfide, bis(3-trimethoxysilylpropyl) tetrasulfide, bis(2-triethoxysilylethyl) disulfide, bis(2-triethoxysilylethyl) trisulfide, bis(2-triethoxysilylethyl) tetrasulfide, 3-trimethoxysilylpropyl benzothiazole disulfide, 3-trimethoxysilylpropyl benzothiazole trisulfide, and 3-trimethoxysilylpropyl benzothiazole tetrasulfide.

[Softener]

The rubber composition according to the present invention contains a resin and an oil component as softeners.

When the rubber composition contains the resin and the oil component in addition to the rubber component and the filler described above, a tire having excellent wet grip performance can be obtained.

(Resin)

The resin preferably has a glass transition temperature (Tg) of higher than 60° C.

When the glass transition temperature is higher than 60° C., abrasion resistance can be improved. In addition, WET performance can be improved by using the resin having a glass transition temperature of higher than 60° C. in combination with aluminum hydroxide. The glass transition temperature of the resin is preferably 95° C. or lower from a viewpoint of processability. The Tg of the resin can be obtained by a differential scanning calorimeter.

Examples of the resin include a C5-based resin, a terpene-based resin, a C5-C9-based resin, a C9-based resin, a terpene-aromatic compound-based resin, and a phenol resin.

Examples of the C5-based resin include an aliphatic hydrocarbon resin and an alicyclic hydrocarbon resin.

Examples of the aliphatic hydrocarbon resin include a petroleum resin produced by polymerizing C5-based petroleum fractions. Examples of the alicyclic hydrocarbon resin include a cyclopentadiene-based petroleum resin which is produced using cyclopentadiene extracted from C5-based fractions as a main raw material, and a dicyclopentadiene-based petroleum resin which is produced using dicyclopentadiene in C5-based fractions as a main raw material.

Examples of the terpene-based resin include a resin produced using naturally-derived turpentine oil or orange oil as a main raw material.

Examples of the C5-C9-based resin include one or more petroleum resins selected from an aromatic-modified aliphatic petroleum resin and an aliphatic-modified aromatic petroleum resin. The C5-C9-based resin is a solid polymer obtained by polymerizing petroleum-derived C5-based to C11-based fractions, and contains the aromatic-modified aliphatic petroleum resin and the aliphatic-modified aromatic petroleum resin based on a component ratio of the solid polymer.

Examples of the C9-based resin include a C9-based synthetic petroleum resin, which is a solid polymer obtained by polymerizing C9-based fractions using a Friedel-Crafts catalyst such as $AlCl_3$ and $BF_3$.

Examples of the terpene-aromatic compound-based resin include a terpene phenol resin.

Examples of the phenol resin include a phenol-formaldehyde resin, a resorcin-formaldehyde resin, and a cresol-formaldehyde resin.

(Oil Component)

Examples of the oil component include process oil, such as paraffin oil, naphthenic oil, liquid paraffin, petroleum asphalt, and aroma oil.

The rubber composition preferably contains the oil component in a range of more than 0 parts by mass and 20 parts by mass or less per 100 parts by mass of the rubber component.

When a content of the oil component in the rubber composition is more than 0 parts by mass per 100 parts by mass of the rubber component, wet grip performance of a tire can be further improved, and when the content is 20 parts by mass or less, DRY steering stability can be secured.

From a viewpoint of the wet grip performance and the DRY steering stability, the content of the oil component in the rubber composition is more preferably 7 parts by mass or more, and still more preferably 10 parts by mass or more, and is more preferably 18 parts by mass or less, and still more preferably 17 parts by mass or less, per 100 parts by mass of the rubber component.

[Vulcanizing Agent]

The rubber composition according to the present invention preferably contains a vulcanizing agent.

The vulcanizing agent is not particularly limited and sulfur is generally used, and examples thereof include powdered sulfur, precipitated sulfur, colloidal sulfur, surface-treated sulfur, and insoluble sulfur.

In the rubber composition according to the present invention, a content of the vulcanizing agent is preferably 0.1 to 10 parts by mass per 100 parts by mass of the rubber component. When the content is 0.1 parts by mass or more, vulcanization can sufficiently proceed, and when the content is 10 parts by mass or less, aging resistance of the vulcanized rubber can be prevented.

The content of the vulcanizing agent in the rubber composition is more preferably 0.5 to 7 parts by mass, and still more preferably 0.7 to 4 parts by mass per 100 parts by mass of the rubber component.

In addition to the above components, the rubber composition according to the present invention may appropriately and selectively contain, within a range not impairing the object of the present invention, a compounding agent generally used in the rubber industry as necessary, such as stearic acid, an antioxidant, zinc oxide, and a vulcanization accelerator.

The rubber composition can be produced by mixing the components including the rubber component, the filler, the resin, and the oil component, and kneading the mixed components using a kneader such as a Banbury mixer, a roll, or an internal mixer.

The kneading of the components may be performed totally in one stage or performed in two or more stages. When the kneading is divided into two or more stages, it is preferable to knead the components that hardly contribute to vulcanization or vulcanization acceleration of the rubber component, such as the rubber component, the filler, the silane coupling agent, the resin, the oil component, the stearic acid, and the antioxidant, until a stage earlier than a final stage, and to vulcanize the rubber component and further mix and knead the components that accelerate the vulcanization in the final stage. The kneading of the components that hardly contribute to the vulcanization or the vulcanization acceleration of the rubber component may be further divided into two or more stages.

In a case of kneading in two stages, a maximum temperature in the first stage of kneading is preferably 140° C. to 160° C., and a maximum temperature in the second stage is preferably 90° C. to 120° C.

<Pneumatic Tire>

A pneumatic tire according to the present invention is prepared by using the rubber composition according to the present invention.

It is preferably to use the rubber composition according to the present invention to produce a tire tread and a tire including the tire tread.

The tire according to the present invention contains the rubber composition according to the present invention having the configuration described above, and is thus excellent in balance between dry steering stability and low rolling resistance while excellent on-ice performance and wet grip performance are maintained.

The tire may be obtained by molding and then vulcanizing an unvulcanized rubber composition according to a type or a member of a tire to be applied, or may be obtained by temporarily obtaining a semi-vulcanized rubber from the unvulcanized rubber composition through a preliminary vulcanization step or the like, then molding the semi-vulcanized rubber, and further performing primary vulcanization.

For example, the rubber composition according to the present invention containing various components is processed into a tire tread in an unvulcanized stage, and the tire tread is pasted and molded on a tire molding machine by a usual method so as to mold a green tire. The green tire is heated and pressurized in a vulcanizer to obtain a tire.

EXAMPLES

Hereinafter, the present invention will be described in more detail with reference to Examples, but these Examples are for the purpose of exemplifying the present invention and do not limit the present invention in any way.

Preparation of Rubber Composition and Preparation of Tire

Comparative Examples 1 to 8 and Examples 1 to 4 and 9 to 12

Components were mixed according to mixing composition as shown in Tables 1 to 3 and kneaded to obtain rubber compositions according to Comparative Examples 1 to 8, and Examples 1 to 4 and 9 to 12. In the tables, the blank column means that the mixing amount is 0 parts by mass.

Examples 5 to 8

Components were mixed according to mixing composition as shown in Table 2 and kneaded to obtain rubber compositions according to Examples 5 to 8. In the table, the blank column means that the mixing amount is 0 parts by mass.

Details of the components in the tables are as follows.

(Rubber Component)

- NR: natural rubber
- Low-Tg unmodified SBR: unmodified styrene-butadiene copolymer rubber, trade name "JSR 1723" manufactured by JSR Corporation, Tg=−55° C., bound styrene content=23.5%
- Low-Tg modified SBR: modified styrene-butadiene copolymer rubber produced in Production Example 1 below, Tg=−65° C., bound styrene content=10%
- High-Tg modified SBR: modified styrene-butadiene copolymer rubber produced in Production Example 2 below, Tg=−38° C., bound styrene content=35%

(Filler, Etc.)

- Carbon black: trade name "SEAST 7HM" manufactured by Tokai Carbon Co., Ltd., ISAF-HS grade
- Higilite: aluminum hydroxide, trade name "ALUMINUM HYDROXIDE" manufactured by Nippon Light Metal Co., Ltd.
- Silica 1: silica, CTAB specific surface area=155 $m^2/g$
- Silica 2: silica, CTAB specific surface area=200 $m^2/g$
- Silica 3: silica, CTAB specific surface area=110 $m^2/g$
- Silane coupling agent: silane coupling agent, trade name "Si75" manufactured by Evonik (Softeners, Etc.)

- Resin 1: Tg=89° C., C9-based resin, trade name "NISSEKI NEOPOLYMER 140" manufactured by ENEOS Corporation
- Resin 2: Tg=48° C., C5-C9-based resin, trade name "ECR213" manufactured by ExxonMobil Chemical Co.
- Resin 3: Tg=75° C., hydrogenated C5-based resin, trade name "Impera E1780 (registered trademark)" manufactured by Eastman Co.
- Oil: trade name "A/0 mix" manufactured by Sankyo Yuka Kogyo K.K.
- Wax: microcrystalline wax, trade name "OZOACE 0701" manufactured by Nippon Seiro Co., Ltd.
- Antioxidant package: containing trade name "NOCRAC 6C" manufactured by Ouchi Shinko Chemical Industrial Co., Ltd.
- Zinc oxide: zinc oxide
- Vulcanization accelerator package: containing trade name "SANCELER D" manufactured by Sanshin Chemical Industry Co., Ltd.

(Measurement of Physical Properties)

1. Glass Transition Temperature (Tg) and Bound Styrene Content of Styrene-Butadiene Copolymer Rubber (1) Glass Transition Temperature (Tg)

A modified styrene-butadiene copolymer rubber was used as a sample, a DSC curve was recorded while increasing a temperature from −100° C. at 20° C./min under a flow of helium at 50 mL/min using DSC 250 manufactured by TA Instruments, and a peak top (inflection point) of the DSC differential curve was defined as the glass transition temperature.

(2) Bound Styrene Content

A modified styrene-butadiene copolymer rubber was used as a sample, 100 mg of the sample was added to 100 mL of chloroform and dissolved to prepare a measurement sample. The bound styrene content (% by mass) per 100% by mass of the sample was measured using an amount of absorption by a phenyl group in styrene at an ultraviolet absorption wavelength (around 254 nm) (spectrophotometer "UV-2450" manufactured by Shimadzu Corporation).

The glass transition temperature (Tg) and the bound styrene content of the low-Tg unmodified SBR are values of a manufacturer catalog.

2. Cetyltrimethylammonium Bromide Specific Surface Area (CTAB Specific Surface Area) of Silica The CTAB specific surface areas of silica 1 to silica 3 were measured by a method according to a method in ASTM-D3765-80.

Production Examples of Modified SBR

1. Production Example 1 (Production Example of Low-Tg Modified SBR)

A cyclohexane solution of 1,3-butadiene and a cyclohexane solution of styrene were added in amounts of 67.5 g of 1,3-butadiene and 7.5 g of styrene to an 800 mL pressure-resistant glass container that was dried and purged with nitrogen. Further, 0.09 mmol of 2,2-ditetrahydrofurylpropane and 0.7 mmol of n-butyllithium were added to the pressure-resistant glass container. Thereafter, polymerization was performed at 50° C. for 1.5 hours.

To the polymerization reaction system in which a polymerization conversion rate at this time was substantially 100%, 0.63 mmol of N,N-bis(trimethylsilyl)-3-[diethoxy(methyl)silyl]propylamine as a modifying agent was added, and a modification reaction was performed at 50° C. for 30 minutes. Thereafter, 2 mL of a 5% by mass isopropanol solution of 2,6-di-t-butyl-p-cresol (BHT) was added to stop the reaction, and the resultant was dried according to a usual method to obtain a modified SBR.

As a result of measuring a microstructure of the obtained modified SBR (low-Tg modified SBR), the bound styrene content was 10%, a vinyl bond content of a butadiene moiety was 40%, and a peak molecular weight was 200,000.

2. Production Example 2 (Production Example of High-Tg Modified SBR)

A cyclohexane solution of 1,3-butadiene and a cyclohexane solution of styrene were added in amounts of 70.2 g of 1,3-butadiene and 39.5 g of styrene to an 800 mL pressure-resistant glass container that was dried and purged with nitrogen. Further, 0.19 mmol of 2,2-ditetrahydrofurylpropane and 1.56 mmol of n-butyllithium were added to the pressure-resistant glass container. Thereafter, polymerization was performed at 50° C. for 1.5 hours.

To the polymerization reaction system in which a polymerization conversion rate at this time was substantially 100%, 1.40 mmol of N-(1,3-dimethylbutylidene)-3-triethoxysilyl-1-propaneamine as a modifying agent was added, and a modification reaction was performed at 50° C. for 30 minutes. Thereafter, 2 mL of a 5% by mass isopropanol solution of 2,6-di-t-butyl-p-cresol (BHT) was added to stop the reaction, and the resultant was dried according to a usual method to obtain a modified SBR.

As a result of measuring a microstructure of the obtained modified SBR (high-Tg modified SBR), the bound styrene content was 35% by mass.

Evaluation

Comparative Examples 1 to 8 and Examples 1 to 4 and 9 to 12

Vulcanized rubbers were obtained from the rubber compositions according to Comparative Examples 1 to 8, and Examples 1 to 4 and 9 to 12. The following performances of the obtained vulcanized rubbers were evaluated. Evaluation results are shown in Tables 1 to 3.

Examples 5 to 8

Vulcanized rubbers are obtained from the rubber compositions according to Examples 5 to 8. The following performances of the obtained vulcanized rubbers are evaluated. Evaluation results are shown in Table 2. Evaluations of the performances according to Examples 5 to 8 are predicted values.

(1) Wet Grip Performance (Braking Performance on Wet Road)

By using a vulcanized rubber obtained by vulcanizing a rubber composition at 145° C. for 33 minutes, a resistance value of a test piece (vulcanized rubber) on a wet concrete road surface was measured using a British portable skid tester. Evaluation results were expressed as indexes with a value according to Comparative Example 1 set as 100. A larger numerical value means more excellent wet grip performance.

An allowable range thereof is 94 or more.

(2) Dry Steering Stability

A storage elastic modulus (E') of the vulcanized rubber was measured using a spectrometer manufactured by Ueshima Seisakusho Co., Ltd. under conditions of a temperature of 30° C., an initial strain of 2%, a dynamic strain of 1%, and a frequency of 52 Hz. Measurement results were expressed as indexes with a storage elastic modulus (E') according to Comparative Example 1 set as 100.

A larger index means better dry steering stability of the tire obtained from the vulcanized rubber.

An allowable range thereof is 101 or more.

(3) Low Rolling Resistance

A loss tangent (tan δ) of the vulcanized rubber was measured at a temperature of 50° C., a strain of 5%, and a frequency of 15 Hz using a viscoelasticity measuring device [manufactured by Rheometrics Co., Ltd.]. An evaluation result according to Comparative Example 1 was set as 100, and relative evaluations were performed. A larger numerical value means lower rolling resistance and better low rolling resistance of the tire obtained from the vulcanized rubber.

An allowable range thereof is 100 or more.

(4) On-Ice Performance

A storage elastic modulus (E') of the vulcanized rubber was measured using a spectrometer manufactured by Ueshima Seisakusho Co., Ltd. under conditions of a temperature of −20° C., an initial strain of 2%, a dynamic strain of 1%, and a frequency of 52 Hz, and was calculated based on a result of the measurement.

An allowable range thereof is 100 or more.

(5) Abrasion Resistance

An abrasion amount of the vulcanized rubber at a slip ratio of 60% at room temperature was measured using a Lambourn abrasion tester.

A reciprocal of an abrasion amount of the vulcanized rubber according to Comparative Example 1 was set as 100, and other measurement results were expressed as indexes. A larger index value indicates a smaller abrasion amount and more excellent abrasion resistance.

An allowable range thereof is 102 or more.

TABLE 1

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| NR | Part | 50 | 70 | 20 | 50 | 50 | 50 | 50 | 50 |
| Low-Tg unmodified SBR | Part | | | | | | | 50 | |
| Low-Tg modified SBR | Part | 50 | 30 | 80 | 40 | 50 | 50 | | 50 |
| Carbon black | Part | 5 | 5 | 5 | 5 | 5 | 5 | 5 | 5 |
| Higilite | Part | | | | | | | | 30 |
| Silica 1 | Part | 80 | 80 | 80 | 80 | | 80 | 80 | 80 |
| Silica 3 | Part | | | | | 80 | | | |
| Silane coupling agent | Part | 9.8 | 9.8 | 9.8 | 9.8 | | 9.8 | 9.8 | 9.8 |
| Resin 1 (C9-based resin, Tg = 89° C.) | Part | 12 | 12 | 12 | 12 | | 25 | 12 | 12 |
| Oil | Part | 10 | 10 | 10 | 10 | | 10 | 10 | 10 |
| Stearic acid | Part | 1 | 1 | 1 | 1 | | 1 | 1 | 1 |
| Wax | Part | 2 | 2 | 2 | 2 | | 2 | 2 | 2 |
| Antioxidant package | Part | 4.3 | 4.3 | 4.3 | 4.3 | | 4.3 | 4.3 | 1.8 |
| Zinc oxide | Part | 2.5 | 2.5 | 2.5 | 2.5 | | 2.5 | 2.5 | 2.5 |
| Vulcanization accelerator package | Part | 4.1 | 4.1 | 4.1 | 4.1 | | 4.7 | 4.1 | 4.1 |
| Sulfur | Part | 1.8 | 1.8 | 1.8 | 1.8 | | 1.8 | 1.8 | 1.8 |
| Wet grip performance | — | 100 | 103 | 97 | 103 | 102 | 103 | 88 | 110 |
| Dry steering stability (E' 30° C.) | — | 100 | 105 | 97 | 104 | 94 | 102 | 105 | 100 |
| Low rolling resistance | — | 100 | 88 | 106 | 94 | 101 | 91 | 84 | 100 |
| On-ice performance | — | 100 | 85 | 106 | 93 | 102 | 92 | 88 | 100 |
| Abrasion resistance | — | 100 | 102 | 85 | 100 | 92 | 96 | 91 | 85 |

TABLE 2

| | | Example 1 | Example 2 | Example 3 | Example 4 | Example 5 | Example 6 | Example 7 | Example 8 |
|---|---|---|---|---|---|---|---|---|---|
| NR | Part | 40 | 30 | 30 | 30 | 40 | 30 | 30 | 30 |
| Low-Tg modified SBR | Part | 60 | 60 | 60 | 60 | 60 | 60 | 60 | 60 |
| High-Tg modified SBR | Part | | 10 | 10 | 10 | | 10 | 10 | 10 |
| Carbon black | Part | 5 | 5 | 5 | 5 | 5 | 5 | 5 | 5 |
| Higilite | Part | 10 | 10 | 10 | 10 | | | | |
| Silica 2 | Part | 80 | 80 | 85 | 80 | 80 | 80 | 85 | 80 |
| Silane coupling agent | Part | 9.8 | 9.8 | 10.2 | 9.8 | 9.8 | 9.8 | 10.2 | 9.8 |
| Resin 1 (Tg = 89° C., C9-based resin) | Part | 12 | 12 | 12 | 12 | 12 | 12 | 12 | 12 |
| Oil | Part | 10 | 10 | 10 | 15 | 10 | 10 | 10 | 15 |
| Stearic acid | Part | 1 | 1 | 1 | 1 | 1 | 1 | 1 | 1 |
| Wax | Part | 2 | 2 | 2 | 2 | 2 | 2 | 2 | 2 |
| Antioxidant package | Part | 4.3 | 4.3 | 4.3 | 4.3 | 4.3 | 4.3 | 4.3 | 4.3 |
| Zinc oxide | Part | 2.5 | 2.5 | 2.5 | 2.5 | 2.5 | 2.5 | 2.5 | 2.5 |
| Vulcanization accelerator package | Part | 3.5 | 3.8 | 3.8 | 3.8 | 3.5 | 3.8 | 3.8 | 3.8 |
| Sulfur | Part | 1.8 | 1.8 | 1.8 | 1.8 | 1.8 | 1.8 | 1.8 | 1.8 |
| Wet grip performance | — | 103 | 104 | 104 | 104 | 98 | 99 | 99 | 99 |
| Dry steering stability (E' 30° C.) | — | 102 | 104 | 106 | 101 | 102 | 104 | 106 | 101 |
| Low rolling resistance | — | 103 | 102 | 100 | 103 | 103 | 102 | 100 | 103 |
| On-ice performance | — | 102 | 101 | 100 | 105 | 102 | 101 | 100 | 105 |
| Abrasion resistance | — | 105 | 105 | 106 | 102 | 110 | 105 | 106 | 102 |

TABLE 3

| | | Example 9 | Example 10 | Example 11 | Example 12 |
|---|---|---|---|---|---|
| NR | Part | 40 | 40 | 40 | 40 |
| Low-Tg modified SBR | Part | 60 | 60 | 60 | 60 |
| Carbon black | Part | 5 | 5 | 5 | 5 |
| Higilite | Part | 10 | 10 | | |
| Silica 2 | Part | 80 | 80 | 80 | 80 |
| Silane coupling agent | Part | 9.8 | 9.8 | 9.8 | 9.8 |

TABLE 3-continued

| | | Example 9 | Example 10 | Example 11 | Example 12 |
|---|---|---|---|---|---|
| Resin 2 (Tg = 48° C., C5-C9-based resin) | Part | 12 | | 12 | |
| Resin 3 (Tg = 75° C., hydrogenated C5-based resin) | Part | | 12 | | 12 |
| Oil | Part | 10 | 10 | 10 | 10 |
| Stearic acid | Part | 1 | 1 | 1 | 1 |
| Wax | Part | 2 | 2 | 2 | 2 |
| Antioxidant package | Part | 4.3 | 4.3 | 4.3 | 4.3 |
| Zinc oxide | Part | 2.5 | 2.5 | 2.5 | 2.5 |
| Vulcanization accelerator package | Part | 3.5 | 3.5 | 3.5 | 3.5 |
| Sulfur | Part | 1.8 | 1.8 | 1.8 | 1.8 |
| Wet grip performance | — | 100 | 100 | 95 | 94 |
| Dry steering stability (E' 30° C.) | — | 101 | 101 | 99 | 99 |
| Low rolling resistance | — | 109 | 110 | 110 | 112 |
| On-ice performance | — | 105 | 106 | 106 | 106 |
| Abrasion resistance | — | 102 | 106 | 107 | 110 |

As can be seen from Table 2, in Examples, indexes of the wet grip performance are 94 or more, indexes of the dry steering stability are 101 or more, indexes of the low rolling resistance are 100 or more, and indexes of the on-ice performance are 100 or more. That is, it can be seen from the rubber compositions according to Examples that a pneumatic tire, which has improved balance between the dry steering stability and the low rolling resistance while excellent on-ice performance and wet grip performance are maintained, is obtained. Further, in Examples, indexes of the abrasion resistance are 102 or more, and the vulcanized rubber obtained from the rubber compositions according to Examples is also excellent in abrasion resistance.

As can be seen from comparison between Examples 5 to 8 containing the natural rubber, the low-Tg modified SBR, the resin, the silica having a CTAB specific surface area of 190 $m^2/g$ or more, and the oil component, and Examples 1 to 4 further containing aluminum hydroxide, the wet grip performance is greatly improved in Examples 1 to 4.

Similarly, as can be seen from comparison between Example 9 and Example 11 and comparison between Example 10 and Example 12, a system containing aluminum hydroxide (Examples 9 and 10) has improved wet grip performance as compared with a system not containing aluminum hydroxide (Examples 11 and 12).

Further, from comparison between a system containing the resin having a glass transition temperature of higher than 60° C. (resins 1 and 3) and a system containing the resin having a glass transition temperature of 60° C. or lower (resin 2), it can be seen that the system containing the resin having a glass transition temperature of higher than 60° C. is more excellent in abrasion resistance. Specifically, an improvement in abrasion resistance can be grasped based on comparison between Examples 1 and 10 with Example 9 (comparison in a mode of containing aluminum hydroxide) and comparison between Examples 5 and 12 with Example 11 (comparison in a mode of not containing aluminum hydroxide).

In contrast, the rubber compositions according to Comparative Examples 1 to 8 as shown in Table 1 do not contain any one or more of the silica having a CTAB specific surface area of 190 $m^2/g$ or more, the resin, the oil, the low-Tg modified SBR, and the natural rubber, and any one or more of the wet grip performance, the dry steering stability, the low rolling resistance, and the on-ice performance are below the allowable ranges.

The invention claimed is:

1. A rubber composition comprising:

a rubber component comprising a natural rubber and a modified styrene-butadiene copolymer rubber having a glass transition temperature of −50° C. or lower;

a resin;

a filler comprising silica having a cetyltrimethylammonium bromide specific surface area of 190 $m^2/g$ or more; and an oil component, wherein a content of the modified styrene-butadiene copolymer rubber in the rubber component is more than 50% by mass, the filler comprises aluminum hydroxide, a ratio (s/a) of a content(s) of the silica to a content (a) of the aluminum hydroxide is 5 to 10 on a mass basis, the content of the silica having a cetyltrimethylammonium bromide specific surface area of 190 $m^2/g$ or more is 100% by mass in a total amount of all silica, and the rubber component further comprises 1% to 30% by mass of a modified styrene-butadiene copolymer rubber having a glass transition temperature of −40° C. or higher.

2. The rubber composition according to claim 1, wherein the silica is comprised in an amount of 60 parts by mass or more per 100 parts by mass of the rubber component.

3. The rubber composition according to claim 2, wherein the oil component is comprised in an amount of more than 0 parts by mass and 20 parts by mass or less per 100 parts by mass of the rubber component.

4. The rubber composition according to claim 2, wherein the resin has a glass transition temperature of higher than 60° C.

5. A pneumatic tire using:

the rubber composition according to claim 2.

6. The rubber composition according to claim 1, wherein the aluminum hydroxide is comprised in an amount of 1 to 20 parts by mass per 100 parts by mass of the rubber component.

7. The rubber composition according to claim 1, wherein the oil component is comprised in an amount of more than 0 parts by mass and 20 parts by mass or less per 100 parts by mass of the rubber component.

8. The rubber composition according to claim 1, wherein the resin has a glass transition temperature of higher than 60° C.

9. A pneumatic tire using:
the rubber composition according to claim 1.

* * * * *